United States Patent
Yang et al.

(10) Patent No.: US 11,077,522 B2
(45) Date of Patent: Aug. 3, 2021

(54) METHOD OF LASER SPOT WELDING COATED STEELS

(71) Applicant: GM GLOBAL TECHNOLOGY OPERATIONS LLC, Detroit, MI (US)

(72) Inventors: David Yang, Shanghai (CN); Wu Tao, Tianmen (CN); Li Sun, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 613 days.

(21) Appl. No.: 15/779,743

(22) PCT Filed: Jan. 18, 2016

(86) PCT No.: PCT/CN2016/071176
§ 371 (c)(1),
(2) Date: May 29, 2018

(87) PCT Pub. No.: WO2017/124216
PCT Pub. Date: Jul. 27, 2017

(65) Prior Publication Data
US 2020/0316713 A1     Oct. 8, 2020

(51) Int. Cl.
*B23K 26/20* (2014.01)
*B23K 26/32* (2014.01)
(Continued)

(52) U.S. Cl.
CPC .......... *B23K 26/22* (2013.01); *B23K 26/0736* (2013.01); *B23K 26/322* (2013.01);
(Continued)

(58) Field of Classification Search
CPC ........... B23K 26/073–0736; B23K 26/32–324; B23K 26/20–302
See application file for complete search history.

(56) References Cited

U.S. PATENT DOCUMENTS 6,479,168 B2 * 11/2002 Mazumder ........... B23K 35/004
428/659
2004/0200813 A1   10/2004 Alips et al.
(Continued)

FOREIGN PATENT DOCUMENTS

CN         1325220 C    7/2007
CN       101695790 A    4/2010
(Continued)

OTHER PUBLICATIONS

International Search Report and Written Opinion for application No. PCT/CN2016/071176; 8 pages.

*Primary Examiner* — Michael A Laflame, Jr.
(74) *Attorney, Agent, or Firm* — Harness, Dickey & Pierce, P.L.C.

(57) ABSTRACT

A method of laser spot welding a workpiece stack-up that includes at least two overlapping steel workpieces, at least one of which includes a surface coating, is disclosed. The method includes directing a laser beam at the top surface of the workpiece stack-up to create a molten steel weld pool that penetrates into the stack-up. The molten steel weld pool is then grown to penetrate further into the stack-up by increasing an irradiance of the laser beam while reducing the projected sectional area of the laser beam at a plane of the top surface of the workpiece stack-up. Increasing the irradiance of the laser beam may be accomplished by moving a focal point of the laser beam closer to the top surface or by reducing an angle of incidence of the laser beam so as to reduce the eccentricity of the projected sectional area of the laser beam.

20 Claims, 3 Drawing Sheets

(51) Int. Cl.
  *B23K 26/22*   (2006.01)
  *B23K 26/073*   (2006.01)
  *B23K 26/322*   (2014.01)
  *B23K 103/10*   (2006.01)
  *B23K 103/00*   (2006.01)
  *B23K 101/34*   (2006.01)
  *B23K 101/00*   (2006.01)

(52) U.S. Cl.
  CPC .... *B23K 2101/006* (2018.08); *B23K 2101/34* (2018.08); *B23K 2103/10* (2018.08); *B23K 2103/50* (2018.08)

(56) References Cited

U.S. PATENT DOCUMENTS

| | | | |
|---|---|---|---|
| 2009/0220815 A1* | 9/2009 | Canourgues | C22C 38/02 428/583 |
| 2014/0124488 A1 | 5/2014 | Lee et al. | |
| 2015/0102623 A1 | 4/2015 | Watanabe et al. | |
| 2017/0001261 A1* | 1/2017 | Fujiwara | B23K 26/244 |
| 2018/0036840 A1* | 2/2018 | Hu | B23K 15/0093 |
| 2020/0316714 A1* | 10/2020 | Yang | B23K 26/34 |

FOREIGN PATENT DOCUMENTS

| | | |
|---|---|---|
| CN | 102126086 A | 7/2011 |
| JP | S60177983 A | 9/1985 |
| WO | 0066314 A1 | 11/2000 |
| WO | 0117722 A1 | 3/2001 |
| WO | 2018010132 A1 | 1/2018 |

\* cited by examiner

METHOD OF LASER SPOT WELDING COATED STEELS

TECHNICAL FIELD

The technical field of this disclosure relates generally to laser welding and, more particularly, to a method of laser spot welding together two or more overlapping steel workpieces.

BACKGROUND

Laser spot welding is a metal joining process in which a laser beam is directed at a metal workpiece stack-up to provide a concentrated energy source capable of effectuating a weld joint between the overlapping constituent metal workpieces. In general, two or more metal workpieces are first aligned and stacked relative to one another such that their faying surfaces overlap and confront to establish a faying interface (or faying interfaces) that extends through an intended weld site. A laser beam is then directed towards and impinges a top surface of the workpiece stack-up at the weld site. The heat generated from the absorption of energy from the laser beam initiates melting of the metal workpieces and creates a molten weld pool within the workpiece stack-up. And, if the power density of the laser beam is high enough, a keyhole is produced directly underneath the laser beam and is surrounded by the molten weld pool. A keyhole is a column of vaporized metal derived from the metal workpieces within the workpiece stack-up that may include plasma.

The laser beam creates the molten weld pool in very short order upon impinging the top surface of the workpiece stack-up. Once created, the molten weld pool grows as the laser beam continues to deliver energy to the workpiece stack-up. The molten weld pool eventually grows to penetrate through the metal workpiece impinged by the laser beam and into the underlying metal workpiece or workpieces to a depth that intersects each of the established faying interfaces. The general shape and penetration depth of the molten weld pool can be managed by controlling various characteristics of the laser beam including its power and focal position. When the molten weld pool has stabilized and reached the desired penetration depth in the workpiece stack-up, the transmission of the laser beam is ceased so that it no longer impinges the top surface at the weld site. The molten weld pool quickly cools and solidifies (and collapses the keyhole if present) to form a laser spot weld joint comprised or resolidified composite workpiece material derived from each of the workpieces penetrated by molten weld pool. The resolidified composite workpiece material of the spot weld joint autogenously fusion welds the overlapping workpieces together at the weld site.

The automotive industry is interested in using laser welding to manufacture parts that can be installed on a vehicle. In one example, a vehicle door body may be fabricated from an inner door panel and an outer door panel that are joined together by a plurality of laser welds. The inner and outer door panels are first stacked relative to each other and secured in place by clamps. A laser beam is then sequentially directed at multiple weld sites around the stacked panels in accordance with a programmed sequence to form the plurality of laser spot weld joints as previously described. The process of laser spot welding inner and outer door panels (as well as other vehicle part components such as those used to fabricate hoods, deck lids, body structures such as body sides and cross-members, load-bearing structural members, etc.) is typically an automated process that can be carried out quickly and efficiently. The aforementioned desire to laser spot weld metal workpieces is not unique to the automotive industry; indeed, it extends to other industries that may utilize laser welding as a joining process including the aviation, maritime, railway, and building construction industries, among others.

The use of laser spot welding to join together coated metal workpieces that are often used in manufacturing practices can present challenges. For example, steel workpieces often include a thin zinc-based surface coating for corrosion protection. Zinc has a boiling point of about 906° C., while the melting point of the base steel substrate it coats is typically greater than 1300° C. Thus, when a steel workpiece that includes an outer zinc-based coating is laser spot welded, high-pressure zinc vapors are readily produced at the surfaces of the steel workpiece and have a tendency to disrupt the laser welding process. In particular, the zinc vapors produced at the faying interface(s) of the steel workpieces are forced to diffuse into and through the molten weld pool created by the laser beam unless an alternative escape outlet is provided through the workpiece stack-up. When an adequate escape outlet is not provided, zinc vapors may remain trapped in the molten weld pool as it cools and solidifies, which may lead to defects in the resulting weld joint—such as spatter and porosity—that can degrade the mechanical properties of the laser spot weld joint to such an extent that the joint may be deemed non-confirming.

To deter high-pressure zinc vapors from diffusing into the molten weld pool, conventional manufacturing procedures have called for laser scoring or mechanical dimpling at least one of the two workpieces at each faying interface where a zinc-based coating is present before laser spot welding is conducted. The laser scoring or mechanical dimpling processes create spaced apart protruding features on the faying surface of each steel workpiece that are processed in such a way. Consequently, when the scored/dimpled steel workpiece is stacked-up within the workpiece stack-up, the protruding features impose a gap of about 0.1-0.2 millimeters between the faying surface on which they have been formed and the confronting surface of the adjacent steel workpiece, which provides an escape path to guide zinc vapors along the established faying interface and away from the weld site. But the formation of these protruding features adds an additional step to the overall laser spot welding process and is believed to contribute to the occurrence of undercut weld joints.

Steel workpieces that are used in manufacturing practices may also include other types of surface coatings for performance-related reasons besides those that include zinc. Other notable surface coatings include aluminum-based coatings such as aluminum, an aluminum-silicon alloy, or an aluminum-magnesium alloy, to name but a few additional examples. Unlike zinc, these surface coatings do not boil at a temperature below the melting point of steel, so they are unlikely to produce high-pressure vapors at the faying interface(s) of the workpiece stack-up. Notwithstanding this fact, these surface coatings can be melted and captured by the molten weld pool at the weld site. The introduction of such disparate molten materials into the molten weld pool can lead to a variety of weld defects that have the potential to degrade the mechanical properties of the laser spot weld joint. Molten aluminum or aluminum alloys (e.g., AlSi or AlMg alloys), for instance, can dilute the steel content of the molten weld pool and form brittle Fe—Al intermetallic phases within the weld joint as well as negatively affect the cooling behavior of the molten weld pool. It would thus be a welcome addition to the art if two or more steel workpieces—at least one of which includes a surface coating (i.e., is not considered to be a "bare" steel)—could be laser spot welded together in a way that mitigates the likelihood that weld defects derived from the surface coating(s) will accumulate within the laser spot weld joint and negatively affect its strength.

SUMMARY OF THE DISCLOSURE

A method of laser spot welding a workpiece stack-up that includes overlapping steel workpieces is disclosed. The workpiece stack-up includes two or more steel workpieces, and at least one of those steel workpieces (and possibly all of the steel workpieces) includes a surface coating. The surface coating may be comprised of zinc or an aluminum-based material such as aluminum, an aluminum-silicon alloy, or an aluminum-magnesium alloy, and preferably has a thickness that lies within the range of 3 μm and 30 μm. While any of these surface coating(s) may be added to an underlying base steel substrate for a variety of reasons—a non-limiting list of reasons being to improve corrosion protection, impart strength, and/or improve formability—their presence can be a source of weld defects in the laser spot weld joint. The disclosed laser spot welding method minimizes the impact that surface coatings may have on the laser spot weld joint without requiring—but of course not prohibiting—the practice of corrective procedures such as, for example in the case of zinc-coated steel, the intentional imposition of gaps between the steel workpieces at the faying interface where the zinc coating is present by way of laser scoring or mechanical dimpling.

To begin, the laser spot welding method involves providing a workpiece stack-up that includes two or more overlapping steel workpieces (e.g, two or three overlapping steel workpieces). The steel workpieces are superimposed on each other such that a faying interface is formed between the faying surfaces of each pair of adjacent overlapping steel workpieces. For example, in one embodiment, the workpiece stack-up includes first and second steel workpieces having first and second faying surfaces, respectively, that overlap and confront one another to establish a single faying interface. In another embodiment, the workpiece stack-up includes an additional third steel workpiece situated between the first and second steel workpieces. In this way, the first and second steel workpieces have first and second faying surfaces, respectively, that overlap and confront opposed faying surfaces of the third steel workpiece to establish two faying interfaces. When a third steel workpiece is present, the first and second steel workpieces may be separate and distinct parts or, alternatively, they may be different portions of the same part, such as when an edge of one part is folded over a free edge of another part.

After the workpiece stack-up is provided, a laser beam is directed at, and impinges, a top surface of the workpiece stack-up at a weld site. The irradiance of laser beam has an initial level when the laser beam is first trained at the top surface. This initial irradiance of the laser beam creates a molten steel weld pool that penetrates into the workpiece stack-up. At some point after the molten steel weld pool is created, the irradiance of the laser beam is increased to an elevated level that grows the molten weld pool and causes it to penetrate into the workpiece stack-up towards the bottom surface. The molten steel weld pool penetrates far enough into the workpiece stack-up that it intersects each faying interface established within the stack-up. In some embodiments, the molten steel weld pool penetrates into the workpiece stack-up to a depth within the second steel workpiece, and in other embodiments the molten steel weld pool penetrates all the way through the second steel workpiece and thus breaches the bottom surface of stack-up. Increasing the irradiance of the laser beam during growth of the molten steel weld pool is believed to place the molten steel weld pool into better condition for solidification into a laser weld joint with good strength and mechanical properties.

The irradiance of the laser beam may be increased from its initial level to its elevated level by reducing the projected sectional area of the laser beam at a plane of the top surface of the workpiece stack-up. For example, in one embodiment, the focal point of the laser beam may be moved along its longitudinal beam axis relative to the top surface of the workpiece stack-up such that a more focused portion of the beam intersects the plane of the top surface. As another example, the angle of incidence of the laser beam may be decreased to reduce the eccentricity of the projected sectional area of the laser beam at the plane of the top surface. The irradiance of the laser beam during creation and growth of the molten steel weld pool, moreover, may be controlled to operate in either conduction welding mode or keyhole welding mode. In conduction welding mode, the irradiance range of the laser beam from its initial irradiance level to its elevated irradiance level is low enough that the energy of the laser beam is conducted as heat through the steel workpieces to create only the molten steel weld pool. In keyhole welding mode, the irradiance range of the laser beam from its initial irradiance level to its elevated irradiance level is high enough to vaporize the steel workpieces and produce a keyhole directly underneath the laser beam within the molten steel weld pool.

After the molten steel weld pool has penetrated into the workpiece stack-up far enough to intersect the faying interface(s), the transmission of the laser beam is ceased at the weld site. This may be done without first changing the current status of the projected sectional area of the laser beam or, in other instances, it may be done after increasing the projected sectional area of the laser beam at a plane of the top surface of the workpiece stack-up so as to decrease the irradiance of the laser beam. Upon ceasing transmission of the laser beam, the keyhole (if present) collapses and the molten steel weld pool cools and solidifies into a laser spot weld joint comprised of resolidified composite workpiece material derived from each of the steel workpieces penetrated by the molten weld pool. The resolidified composite workpiece material autogenously fusion welds the overlapping steel workpieces together at the weld site. And, unlike conventional laser spot welding practices, the laser spot weld joint formed according to the disclosed method includes provisions related to the mechanics of the laser beam that helps keep the surface coatings of the one or more steel workpieces from negatively affecting the strength of the laser spot weld joint. The ability to inhibit the surface coatings from contributing to the formation of debilitating weld defects within the laser spot weld joint ultimately leads to strong and durable weld joints that can be consistently attained in a manufacturing setting.

DETAILED DESCRIPTION

Figure 1:
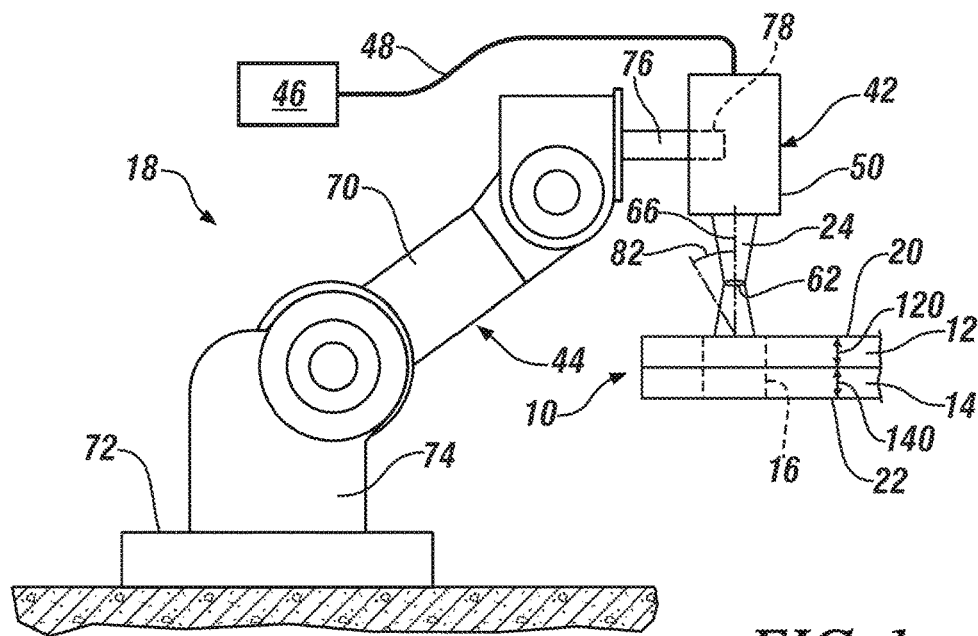
FIG. 1 is a schematic view of an embodiment of a conventional laser welding apparatus in which a laser beam impinges a top surface of a workpiece stack-up that includes two or more overlapping steel workpieces as part of a laser spot welding method that produces a laser spot weld joint within the stack-up.

The disclosed method of laser spot welding a workpiece stack-up comprised of two or more overlapping steel workpieces calls for increasing an irradiance of a laser beam that is trained at a top surface of the stack-up at a weld site during growth of a created molten steel weld pool. Any type of conventional laser welding apparatus may be employed to direct the laser beam towards the top surface of the workpiece stack-up and to increase the irradiance of the laser beam. Moreover, the irradiance range of the laser beam may be controlled to perform the method in either conduction welding mode or keyhole welding mode. The laser beam may thus be a solid-state laser beam or a gas laser beam depending on the characteristics of the steel workpieces being joined and the laser welding mode desired to be practiced. Some notable solid-state lasers that may be used are a fiber laser, a disk laser, a diode laser, and a Nd:YAG laser, and a notable gas laser that may be used is a $CO_2$ laser, although other types of lasers may certainly be used so long as they are able to create the molten steel weld pool.

The laser spot welding method may be performed on a variety of workpiece stack-up configurations. For example, the method may be used in conjunction with a "2T" workpiece stack-up (FIGS. 3-4 and 7) that includes two overlapping and adjacent steel workpieces, or it may be used in conjunction with a "3T" workpiece stack-up (FIGS. 12-14) that includes three overlapping and adjacent steel workpieces. Additionally, the several steel workpieces included in the workpiece stack-up may be of different strengths and grades, and may have similar or dissimilar thicknesses at the weld site, if desired. The laser spot welding method is carried out in essentially the same way to achieve the same results regardless of whether the workpiece stack-up includes two or three overlapping steel workpieces. Any differences in workpiece stack-up configurations can be easily accommodated by adjusting the characteristics of the laser beam such as, for instance, the power of the laser beam, the positioning of the focal point of the laser beam throughout the spot welding process, the amount of time the laser beam is trained on the workpiece stack-up at the weld site, or some combination of those characteristics.

Referring now to FIGS. 1-7, a method of laser spot welding a workpiece stack-up 10 is shown in which the stack-up 10 includes a first steel workpiece 12 and a second steel workpiece 14 that overlap at a weld site 16 where laser spot welding is conducted using a conventional laser welding apparatus 18. The first and second steel workpieces 12, 14 provide a top surface 20 and a bottom surface 22, respectively, of the workpiece stack-up 10. The top surface 20 of the workpiece stack-up 10 is made available to the conventional laser welding apparatus 18 and is accessible by a laser beam 24 emanating from the laser welding apparatus 18. And since only single side access is needed to conduct conventional laser welding, there is no need for the bottom surface 22 of the workpiece stack-up 10 to be made available to the laser welding apparatus 18 in the same way as the top surface 20. Moreover, while only on weld site 16 is depicted in the Figures for the sake of simplicity, skilled artisans will appreciate that laser welding in accordance with the disclosed spot welding method can be practiced at multiple different weld sites spread out throughout the same workpiece stack-up.

The workpiece stack-up 10 may include only the first and second steel workpieces 12, 14, as shown in FIGS. 1-4. Under these circumstances, and as shown best in FIG. 3, the first steel workpiece 12 includes an exterior outer surface 26 and a first faying surface 28, and the second steel workpiece 14 includes an exterior outer surface 30 and a second faying surface 32. The exterior outer surface 26 of the first steel workpiece 12 provides the top surface 20 of the workpiece stack-up 10 and the exterior outer surface 30 of the second steel workpiece 14 provides the oppositely-facing bottom surface 22 of the stack-up 10. And, since the two steel workpieces 12, 14 are the only workpieces present in the workpiece stack-up 10, the first and second faying surfaces 28, 32 of the first and second steel workpieces 12, 14 overlap and confront to establish a faying interface 34 that extends through the weld site 16. In other embodiments, one of which is described below in connection with FIGS. 12-14, the workpiece stack-up 10 may include an additional steel workpiece disposed between the first and second steel workpieces 12, 14 to provide the stack-up 10 with three steel workpieces instead of two.

The term "faying interface" is used broadly in the present disclosure and is intended to encompass a wide range of overlapping relationships between the confronting first and second faying surfaces 28, 32 that can accommodate the practice of laser spot welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer—and thus do not experience the type of interfacial abutment that typifies direct contact—yet are in close enough proximity that laser welding can be practiced. As another example, the faying surfaces 28, 32 may establish the faying interface 34 by being separated by gaps that are purposefully imposed. Such gaps may be imposed between the faying surfaces 28, 32 by creating protruding features on one or both of the faying surfaces 28, 32 through laser scoring, mechanical dimpling, or otherwise. The protruding features maintain intermittent contact points between the faying surfaces 28, 32 that keep the faying surfaces 28, 32 spaced apart outside of and around the contact points by up to 1.0 mm and preferably, between 0.2 mm and 0.8 mm.

Figure 3:
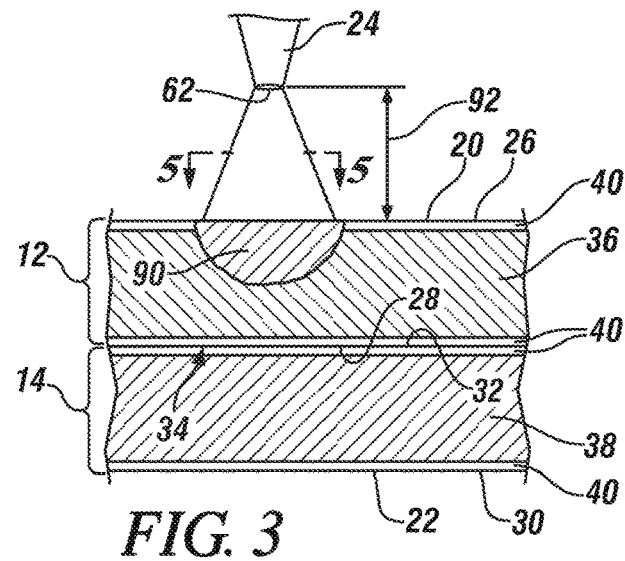
FIG. 3 is a cross-sectional side view of the workpiece stack-up shown in FIGS. 1-2 during laser spot welding in which the laser beam has an initial irradiance level at the top surface of the workpiece stack-up according to one embodiment.

As shown best in FIG. 3, the first steel workpiece 12 includes a first base steel substrate 36 and the second steel substrate 14 includes a second base steel substrate 38. Each of the base steel substrates 36, 38 may be coated or uncoated (i.e., bare), and may be separately composed of any of a wide variety of steels including a low carbon steel (also commonly referred to as mild steel), interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and press-hardened steel (PHS). Moreover, each of the first and second base steel substrates 36, 38 may have been treated to obtain a particular set of mechanical properties, including being subjected to heat-treatment processes such as annealing, quenching, and/or tempering. The first and second steel workpieces 12, 14 (whether coated or uncoated) may be hot or cold rolled to their final thicknesses and may be pre-fabricated to have a particular profile suitable for assembly into the workpiece stack-up 10.

At least one of the first or second steel workpieces 12, 14—and preferably both—includes a surface coating 40 that overlies the base steel substrate 36, 38. As shown in FIG. 3, each of the first and second base steel substrates 36, 38 is coated with a surface coating 40 that, in turn, provides the steel workpieces 12, 14 with their respective exterior outer surfaces 26, 30 and their respective faying surfaces 28, 32. The surface coating 40 applied to one or both of the base steel substrates 36, 38 is preferably a zinc-based material or an aluminum-based material. Some examples of a zinc-based material include zinc or a zinc alloy. Some examples of an aluminum-based material include elemental aluminum, an aluminum-silicon alloy, and an aluminum-magnesium alloy. A coating of a zinc-based material may be applied by hot-dip galvanizing, electro-galvanizing, or galvannealing, typically to a thickness of 2 µm to 16 mµ, and a coating of an aluminum-based material may be applied by dip coating, typically to a thickness of 2 µm to 10 µm, although other coating procedures and thicknesses of the attained coatings may be employed. Taking into the account the thickness of the base steel substrates 36, 38 and their optional surface coatings 40, the first and second steel workpieces 12, 14 have thicknesses 120, 140 that preferably range from 0.4 mm to 4.0 mm, and more narrowly from 0.5 mm to 2.0 mm, at least at the weld site 16. The thicknesses 120, 140 of the first and second steel workpieces 12, 14 may be the same of different from each other.

Figure 2:
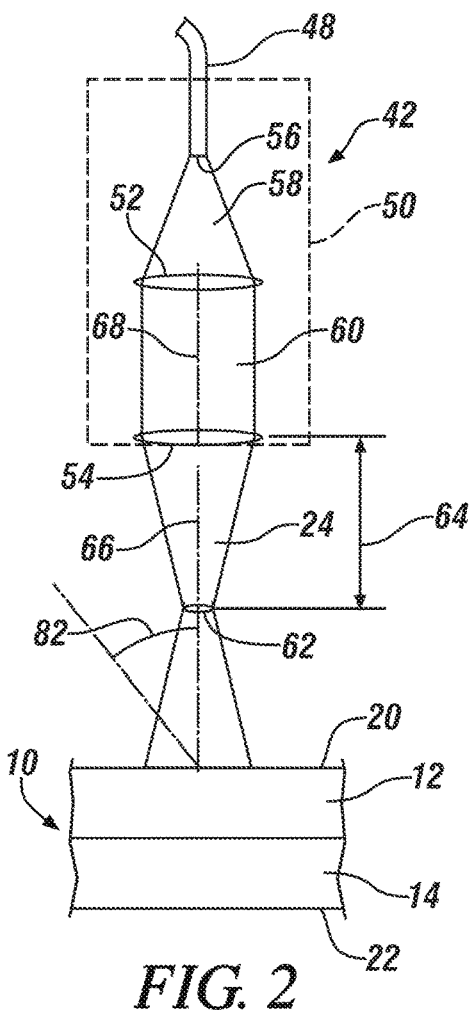
FIG. 2 is a schematic view of the laser optic welding head and a portion of the workpiece stack-up shown in FIG. 1.

Referring now to FIGS. 1-2, the conventional laser welding apparatus 18 includes a laser optic head 42 and a robot 44 that carries the laser optic welding head 42. The laser optic welding head 42, which is coupled to a beam generator 46 by a fiber optic cable 48, focuses and directs the laser beam 24 at the top surface 20 of the workpiece stack-up 10 which, in this embodiment, is the exterior outer surface 26 to the first steel workpiece 12. The laser beam 24 transmitted from the laser optic welding head 42 is preferably a solid-state laser beam that operates with a wavelength in the near-infrared range (700 nm to 1400 nm) of the electromagnetic spectrum and is able to deliver power at a level of 0.3 kW to 50 kW. Some examples of suitable solid-state laser beams include a fiber laser beam, a disk laser beam, and a direct diode laser beam. A preferred fiber laser beam is diode-pumped laser beam in which the laser gain medium is an optical fiber doped with a rare-earth element (e.g., erbium, ytterbium, neodymium, dysprosium, praseodymium, thulium, etc.). A preferred disk laser is a diode-pumped laser beam in which the gain medium is a thin laser crystal disk doped with a rare earth element (e.g., a ytterbium-doped yttrium-aluminum garnet (Yb:YAG) crystal) coated with a reflective surface and mounted to a heat sink. And a preferred direct diode laser is a combined laser beam (e.g., wavelength combined) derived from multiple diodes in which the gain media are semiconductors such as those based on aluminum gallium arsenide (AlGaAs) or indium gallium arsenide (InGaAs).

The laser optic welding head 42 includes a body 50 that houses a collimating lens 52 and a focusing lens 54, as shown in FIG. 2. An end 56 of the fiber optic cable 48 is received in the body 50 and delivers a diverging conical laser beam 58 that originates in the laser beam generator 46 where the gain medium/media is present along with other associated laser components. The diverging conical laser beam 58 passes through the collimating lens 52 to transform the diverging beam 58 into a collimated laser beam 60 having a constant beam diameter. The collimating lens 52 may be a curved lens such as a parabolic or spherical lens. Next, the collimated laser beam 60 passes through the focusing lens 54, which may be curved like the collimating lens 52, to focus the collimated laser beam 60 into the laser beam 24 that exits the laser optic welding head 42 and impinges the top surface 20 of the workpiece stack-up 10. The focusing lens 54 converges the laser beam 24 to a focal point 62 that preferably has a diameter ranging from 0.1 mm to 8 mm and a focal length 64 that ranges from 50 mm to 350 mm. As shown here in FIG. 1, the focal length 64 of the laser beam 24 is the distance between the outside exit surface of the focusing lens 54 and the focal point 62 of the laser beam 24.

The laser beam 24 exits the focusing lens 54 and the laser optic welding head 42 and propagates forward along a longitudinal beam axis 66 that is coaxial with an axis 68 of the focusing lens 54. When the laser optic welding head 42 is operational and the laser beam 24 is being trained on the workpiece stack-up 10, cooling functionality installed in the welding head 42 may be initiated to help ensure the collimating lens 52 and the focusing lens 54 do not overheat. The laser optic welding head 42 may also include visual monitoring equipment (not shown) having a line of sight down the axis 68 of the focusing lens 54 as well as other associated components and equipment. The laser optic welding head 42 shown schematically in FIGS. 1-2 and described above, as well as other design variations not specifically mentioned, are commercially available from a variety of sources. Some notable suppliers of laser optic heads and related laser system equipment for use with the conventional laser welding apparatus 18 include HIGHYAG (Kleinmachnow, Germany) and TRUMPF Inc. (Connecticut, USA).

The robot 44 is operable to move the laser optic welding head 42 within the three-dimensional space above the top surface 20 of the workpiece stack-up 10 in order to position the laser optic welding head 42 as needed to aim the laser beam at the weld site 16. In particular, the robot 44 includes a robot arm 70 and a base 72. One end 74 of the robot arm 70 is connected to the base 72 and an opposite free end of the arm 70 includes a mounting feature 78 that connects to and supports the laser optic welding head 42. The base 72 and the robot arm 70 are constructed with rotary, swivel, hinge, and/or other types of junctions that permit precise and programmable movement of the laser optic welding head 42 in three-dimensions relative to the workpiece stack-up 10 with the aid of computer-implemented control systems. As applicable here to the disclosed laser spot welding method, and as will be further described below, the robot 44 is able to move laser optic welding head 42 to (1) adjust the distance between the focal point 62 of the laser beam 24 and the top surface 20 of the workpiece stack-up 10 and (2) to adjust the angle of incidence of the laser beam 24 relative to the workpiece stack-up 10.

In a preferred embodiment of the laser spot welding method, as illustrated in FIGS. 1-7, the conventional laser welding apparatus 18 is used to form a laser spot weld joint 80 (FIG. 7) between the first and second steel workpieces 12, 14. To begin, and referring now to FIGS. 1-4, the robot 44 positions the laser optic welding head 42 above the top surface 20 of the workpiece stack-up 10 in the vicinity of the weld site 16. Once located, the laser beam 24 is directed at, and impinges, the top surface 20 at the weld site 16 at an angle of incidence 82. The angle of incidence 82 is the angle that the longitudinal beam axis 66 of the laser beam 24 deviates from a linear direction normal to the top surface 20 at the weld site 16. Typically, the angle of incidence 82 may range from 0° (i.e., the longitudinal beam axis 66 of the laser beam 24 is perpendicular to the top surface 20) to 45° in any direction from normality, and may be achieved by controlling or instructing the robot 44 to orient the axis 68 of the focusing lens 54 into the same angular alignment with the top surface 20 of the workpiece stack-up 10 given that that axis 68 of the focusing lens 54 is coaxial with the longitudinal beam axis 66 of the laser beam 24. Here, in the embodiment depicted in FIGS. 2-4, and angle of incidence 82 is 0°.

Figure 5:
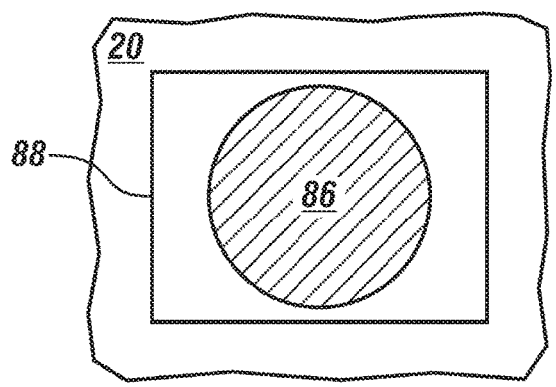
FIG. 5 is a plan view of the projected sectional area of the laser beam at a plane of the top surface of the workpiece stack-up when the focal point of the laser beam is positioned as illustrated in FIG. 3.
Figure 6:
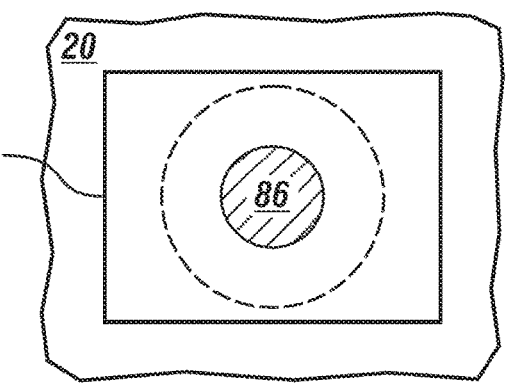
FIG. 6 is a plan view of the projected sectional area of the laser beam at a plane of the top surface of the workpiece stack-up when the focal point of the laser beam is positioned as illustrated in FIG. 4.

The laser beam 24 has an irradiance—also known as intensity or power density—that is determined by dividing the power of the laser beam 24 by the projected sectional area 86 of the laser beam 24 at a plane 88 of the top surface 20 of the workpiece stack-up 10 (FIGS. 5-6). When it first impinges the top surface 20 of the workpiece stack-up 10, the irradiance of the laser beam 24 has an initial level sufficient to create a molten steel weld pool 90 that penetrates into the stack-up 10, as shown in FIGS. 3 and 5. The molten steel weld pool 90 may penetrate partially through the first steel workpiece 12, and thus does not intersect the faying interface 34, when the irradiance of the laser beam 24 is at its initial level, or it may intersect the faying interface 34 and penetrate into the second steel workpiece 14. The initial level of the irradiance of the laser beam 24 can vary based on the compositions and thicknesses 120, 140 of the first and second steel workpieces 12, 14, but, in many instances, ranges from 500 W/cm$^2$ to $1.0\times10^6$ W/cm$^2$ or, more narrowly, from $1.0\times10^3$ W/cm$^2$ to $1.0\times10^6$ W/cm$^2$.

Establishing the initial irradiance level of the laser beam 24 may be achieved by coordinating the power level of the laser beam 24 and the positioning of the focal point 62 of the laser beam 24 relative to the top surface 20 of the workpiece stack-up 10. In particular, in this embodiment, the power level of the laser beam 24 is set to between 0.5 kW and 50 kW, or more narrowly to between 2.0 kW and 6.0 kW, and the focal point 62 of the laser beam 24 is positioned relative to the top surface 20 of the workpiece stack-up 10 at a distance 92 that ranges between −300 mm and 300 mm, or more narrowly between −60 mm and 60 mm, along the longitudinal beam axis 66. Here, in FIG. 3, the focal point 62 is positioned above the top surface 20 and, accordingly, the distance 92 is a positive value. The focal point 62 may of course be positioned below the top surface 20, and even below the bottom surface 22, in which case the distance 92 would be a negative value. Additionally, since the angle of incidence 82 of the laser beam 24 in this embodiment is 0°, the projected sectional area 86 of the laser beam 24 at the plane 88 of the top surface 20 of the workpiece stack-up 10 is circular in nature, as shown in FIG. 5. Moving the focal point 62 of the laser beam 24 toward or away from the top surface 20 of the workpiece stack-up 10 thus has the effect of decreasing or increasing, respectively, the area of the circle that constitutes the projected sectional area 86 of the laser beam 24.

Figure 4:
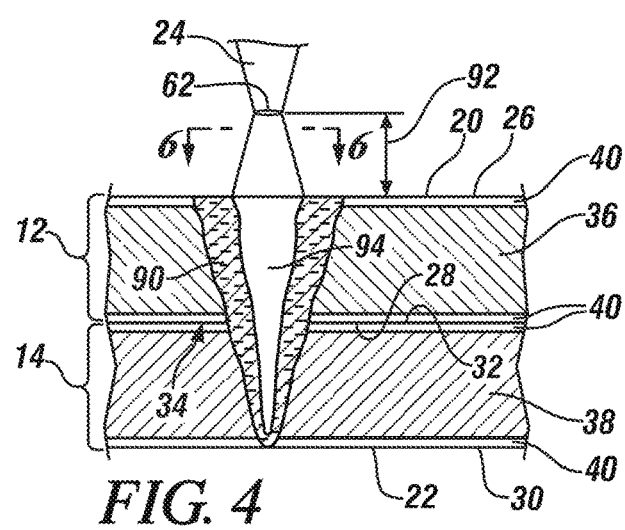
FIG. 4 is a cross-sectional side view of the workpiece stack-up shown in FIG. 3 during laser spot welding in which the irradiance of the laser beam at the top surface of the stack-up has been increased from its initial level (FIG. 2) to an elevated level, and wherein the elevated irradiance level of the laser beam is achieved by moving the focal point of the laser beam relative to the top surface of the workpiece stack-up.

After the molten steel weld pool 90 is created, the irradiance of the laser beam 24 is increased to an elevated level to grow the weld pool 90 and cause it to penetrate further into the workpiece stack-up 10 towards the bottom surface 22, as shown in FIGS. 4 and 6. This involves reducing the projected sectional area 86 of the laser beam 24 at the plane 88 of the top surface 20 of the workpiece stack-up 10 by moving the focal point 62 of the laser beam 24 forward (if distance 92 is positive) along the longitudinal beam axis 66 in the propagation direction towards the top surface 20 or rearward (if distance 92 is negative) along the longitudinal beam axis 66 opposite to the propagation direction. The elevated irradiance level of the laser beam 24 ensures that the molten steel weld pool 90 penetrates far enough into the workpiece stack-up 10 that it intersects the faying interface 34. The molten steel weld pool 90 may, for example, penetrate into the second steel workpiece 14 to a depth between its faying and exterior outer surfaces 32, 30. In other instances, the molten steel weld pool 90 penetrates all the way through the second steel workpiece 14 such that the weld pool 90 breaches the bottom surface 22 (also surface 30) of the workpiece stack-up 10.

The focal point 62 of the laser beam 24 may be moved forward or rearward along its longitudinal beam axis 66 to shorten the distance 92 between the focal point 62 and the top surface 20 of the workpiece stack-up 10 to between −280 mm and 280 mm or, more narrowly, to between −50 mm and 50 mm. The power level of the laser beam 24 is preferably kept constant at that time. The power level of the laser beam 24 may alternatively be increased during the movement of the focal point 62 in order to enhance the irradiance gain. Still further, the power level of the laser beam 24 may even be decreased during movement of the focal point 62 so long as the power level decrease does not fully offset the irradiance gain attained through movement of the focal point 62. While the elevated level of irradiance may vary based on the compositions and thicknesses of the first and second steel workpieces 12, 14—much like the initial irradiance level— the elevated irradiance level of the laser beam 24 usually ranges from 1000 $W/cm^2$ to $1.0 \times 10^9$ $W/cm^2$ or, more narrowly, from $1.0 \times 10^3$ $W/cm^2$ to $1.0 \times 10^8$ $W/cm^2$.

The growth of the molten steel weld pool 90 during the increase in the irradiance level of the laser beam 24 may be carried out with or without producing a keyhole inside of the weld pool 90. For example, as shown in FIG. 4, if the irradiance of the laser beam 24 is great enough at any point between its initial and elevated levels to vaporize the steel workpieces 12, 14, then a keyhole 94 is produced directly underneath the laser beam 24 within the molten steel weld pool 90. The keyhole 94 is a column of vaporized steel that facilitates deep and narrow penetration of molten steel weld pool 90. Indeed, when the keyhole 94 is present, the width of the molten steel weld pool 90 at the top surface 20 of the workpiece stack-up 10 is typically less than the distance to which the weld pool 90 penetrates into the stack-up 10. Alternatively, if the irradiance of the laser beam 24 is not great enough between its initial and elevated levels to vaporize the steel workpieces 12, 14, then the keyhole 94 will not be produced. Under these circumstances, heat from the laser beam 24 is spread by conduction, which typically results in the width of the molten weld pool 90 at the top surface of the workpiece stack-up 10 being greater than the distance to which the weld pool 90 penetrates into the stack-up 10. While the exact irradiance needed to produce the keyhole 94 may vary based on the make-up of the workpiece stack-up 10, in general, the keyhole 94 is produced when the irradiance of the laser beam 24 eclipses $1.0 \times 10^6$ $W/cm^2$ at the plane 88 of the top surface 20.

Figure 7:
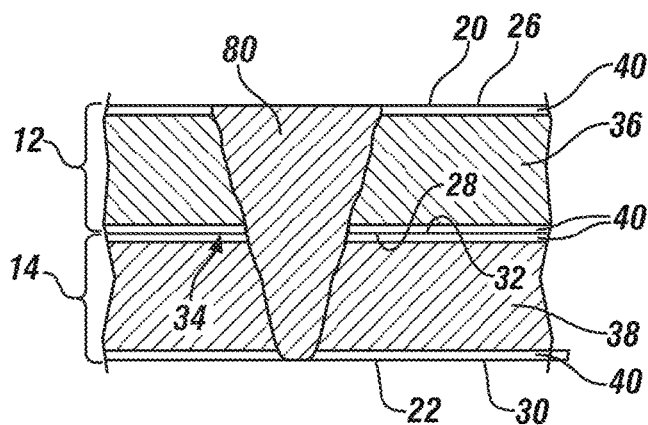
FIG. 7 is a cross-sectional side view of the workpiece stack-up shown in FIG. 3 after transmission of the laser beam has ceased and a laser spot weld joint has been formed between the steel workpieces.

Once the molten steel weld pool 90 has been fully grown and penetrates the workpiece stack-up 10 as desired, the transmission of the laser beam 24 is ceased at the weld site 16, as shown in FIG. 7. The transmission of the laser beam 24 may be ceased without first changing the projected sectional area 86 of the laser beam 24 at the plane 88 of the top surface 20; that is, the projected sectional area 86 attained when the laser beam 24 has reached its elevated irradiance level is maintained up until the transmission of the laser beam 24 is ceased. Such a practice may be performed, for example, when the workpiece stack-up 10 is a 2T stack-up. In another embodiment, just before halting transmission of the laser beam 24, the projected sectional area 86 of the laser beam 24 at the plane 88 of the top surface 20 of the workpiece stack-up 10 may be increased in order to decrease the irradiance of the laser beam 24. This may be accomplish by moving the focal point 62 of the laser beam 24 forward (if distance 92 is negative) or rearward (if distance 92 is positive) along the longitudinal axis 66 to lengthen the distance 92 between the focal point 62 and the top surface 20 of the workpiece stack-up 10. In so doing, the irradiance of the laser beam 24 is preferably decreased to somewhere between its elevated irradiance level and its initial irradiance level before transmission of the laser beam 24 is ceased. The practice of increasing the projected sectional areas 86 the laser beam 24 may be performed, for example, when the workpiece stack-up 10 is a 3T stack-up or when the workpiece stack-up is a 2T stack-up with a total thickness greater than 2 mm.

When transmission of the laser beam 24 is ceased, the keyhole 94, if present, collapses and the molten steel weld pool 90 cools and solidifies into the laser spot weld joint 80, which is comprised of resolidified composite steel material derived from each of the first and second steel workpieces 12, 14. The resolidified composite steel material of the laser spot weld joint 80 intersects the faying interface 34 of the two overlapping steel workpieces 12, 14 and autogenously fusion welds the workpieces 12, 14 together at the weld site 16. The laser spot weld joint 80, moreover, is less liable to be adversely affected by the surface coating 40 included in one or both of the steel workpieces 12, 14 due to the increase in irradiance of the laser beam 24 that transpires during the disclosed laser spot welding method. Indeed, increasing the irradiance of the laser beam 24 from the initial level to the elevated level while reducing the projected sectional area 86 of the laser beam 24 at the plane 88 of the top surface 20 of the workpiece stack-up 10 is believed to promote good strength in the weld joint 80.

Without being bound by theory, it is believed that increasing the irradiance of the laser beam 24 helps disrupt the surface coating 40 that is included in at least one of the first or second steel workpieces 12, 14 so that less weld defects are derived from the coating(s) 40. For instance, if one or both of the steel workpieces 12, 14 include a zinc-based surface coating, the initial low irradiance level of the laser beam 24 may burn and/or oxidize the zinc into high melting-temperature zinc oxides early in the laser spot welding process, thus limiting the amount of zinc that may vaporize and become entrained in the weld pool 90. Moreover, because the issues related to zinc vapors can be effectively dealt with by adjusting the irradiance of the laser beam 24, there is no need to create protruding features (by laser scoring, mechanical dimpling, etc.) on either of the faying surfaces 28, 32, of the steel workpieces 12, 14 in order to attain good strength in the laser spot weld joint 80. Similarly, if one or both of the steel workpieces 12, 14 include an aluminum-based surface coating, the initial low irradiance level may melt or disrupt the aluminum-based surface coating(s) early in the laser spot welding process, which can result in less aluminum or aluminum alloy contamination in the weld pool 90.

The embodiment described above constitutes one way to increase the irradiance of the laser beam 24 by reducing the projected sectional area 86 of the laser beam 24 at the plane 88 of the top surface 20 of the workpiece stack-up 10. There are, of course, other ways to achieve this same objective. One such alternative embodiment is illustrated schematically in FIGS. 8-11. Since the above discussion of the first and second steel workpieces 12, 14 and the conventional laser welding apparatus 18 are equally applicable here and need not be repeated, the following discussion is focused only on the laser beam 24 and how it relates to the workpiece stack-up 10 during formation of the weld joint 80. To be sure, the movement of the laser beam 24 detailed in FIGS. 8-11, and described in the following text, can be achieved, like before, by moving the laser optic welding head 42 in the space above the top surface 20 of the workpiece stack-up 10.

Figure 8:
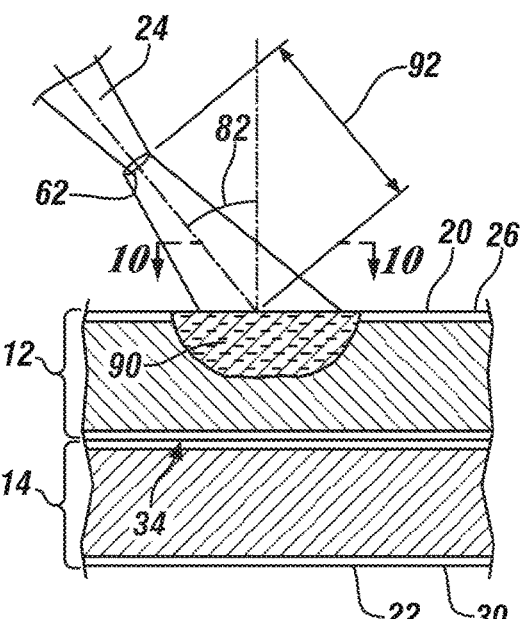
FIG. 8 is a cross-sectional side view of the workpiece stack-up shown in FIG. 1 during laser spot welding in which the laser beam has an initial irradiance level at the top surface of the workpiece stack-up according to another embodiment.
Figure 10:
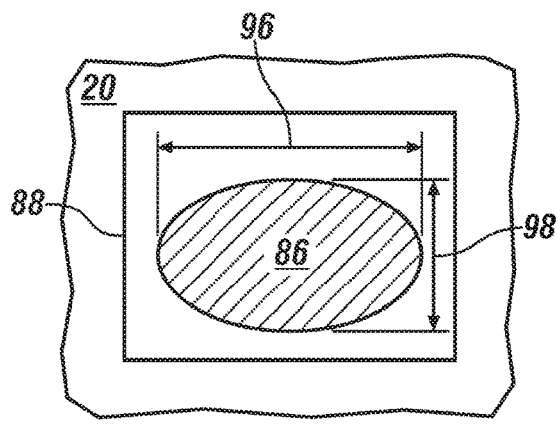
FIG. 10 is a plan view of the projected sectional area of the laser beam at a plane of the top surface of the workpiece stack-up when the angle of incidence of the laser beam is set as illustrated in FIG. 8.

In the alternative embodiment of the disclosed laser spot welding method, the irradiance of the laser beam 24 is increased by adjusting the angle of incidence 82 of the laser beam 24. Specifically, when the laser beam 24 is first trained on the weld site 16, the initial irradiance level of the laser beam 24 is established by setting the angle of incidence 82 of the laser beam 24 to anywhere between 1° and 45° or, more narrowly, to between 2° and 20°, as shown in FIGS. 8 and 10. At the same time, the focal point 62 of the laser beam 24 may be positioned relative to the top surface 20 of the workpiece stack-up 10 a distance 92 that ranges between −300 mm and 300 mm or, more narrowly, between −60 mm and 60 mm, along the longitudinal beam axis 66. Angling the longitudinal beam axis 66 of the laser beam 24 relative to the top surface 20 renders the projected sectional area 86 elliptical in shape. The projected sectional area 86 thus has a major diameter 96 and a minor diameter 98 (FIG. 10) that are perpendicular to each other and intersect at a center of the elliptical sectional area 86. And, since the projected sectional area 86 is elliptical at this time, it has an eccentricity (c) that represents how much the elliptical shape has deviated from a circle. In particular, the eccentricity of an ellipse ranges from 0 (circle) to a value between 0 and 1, with an increase in the ratio of the major diameter 96 to the minor diameter 98 resulting in an increase in eccentricity, and vice versa.

Figure 9:
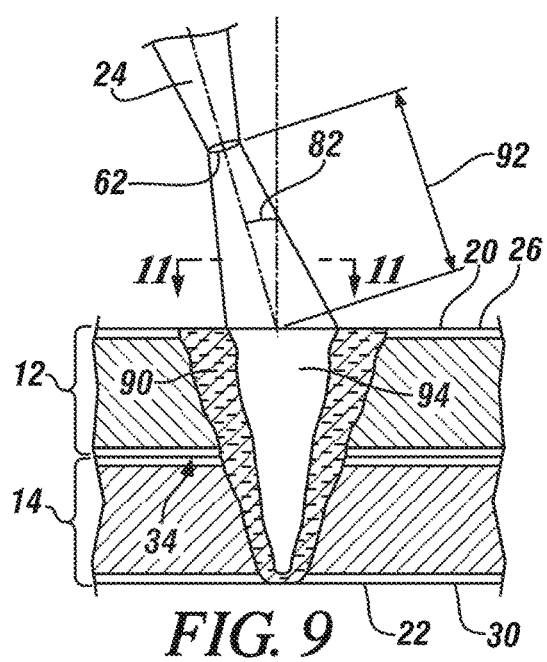
FIG. 9 is a cross-sectional side view of the workpiece stack-up shown in FIG. 8 during laser spot welding in which the irradiance of the laser beam at the top surface of the stack-up has been increased from its initial level (FIG. 8) to an elevated level, and wherein the elevated irradiance level of the laser beam is achieved by reducing the angle of incidence of the laser beam to reduce the eccentricity of the projected sectional area of the laser beam at the plane of the top surface.
Figure 11:
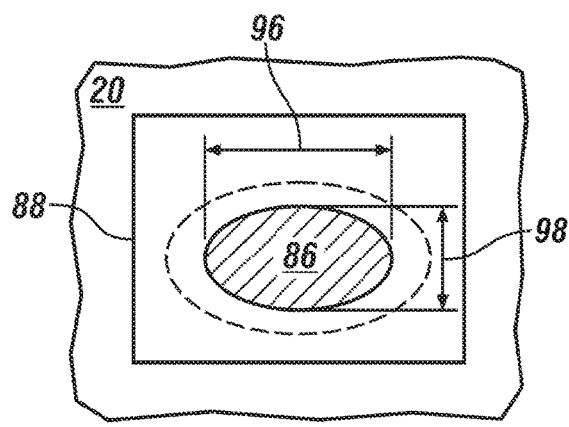
FIG. 11 is a plan view of the projected sectional area of the laser beam at a plane of the top surface of the workpiece stack-up when the angle of incidence of the laser beam is set as illustrated in FIG. 9.

After the laser beam 24 has been trained on the top surface 20 of the workpiece stack-up 10 at its initial irradiance level, and a molten steel weld pool 90 has been created, the irradiance is of the laser beam 24 is increased to its elevated level to grow the weld pool 90 and cause it to penetrate further into the workpiece stack-up 10 towards the bottom surface 22, as before. With reference to FIGS. 9 and 11, the irradiance of the laser beam 24 is increased by reducing the angle of incidence 82 of the laser beam 24 which, in turn, reduces the eccentricity of the projected sectional area 86 of the laser beam 24 at the plane 88 of the top surface 20; that is, the longitudinal beam axis 66 of the laser beam 24 is brought to a more vertical position to reduce the ratio of the major diameter 96 to the minor diameter 98 of the elliptically-shaped projected sectional area 86 of the laser beam 24, thus rendering the projected sectional area 86 less elliptical and more circular. The angle of incidence 82 of the laser beam 24 may be set to anywhere between 0° and 30° or, more narrowly, to between 0° and 20°, in order to establish the elevated irradiance level of the laser beam 24.

Moreover, in order to further reduce the projected sectional area 86 of the laser beam 24 at the plane 88 of the top surface 20 of the workpiece stack-up 10 during realization of the elevated irradiance level, the focal point 62 of the laser beam 24 may be moved to shorten the distance 92 between the focal point 62 and the top surface 20 of the workpiece stack-up 10, as described above. That is, the focal point 62 of the laser beam 24 may be moved forward (if distance 92 is positive) along its longitudinal beam axis 66 in the propagation direction or rearward (if distance 92 is negative) along the longitudinal beam axis 66 opposite to the propagation direction. For instance, the distance 92 may be shortened to between −280 mm and 280 mm or, more narrowly, to between −50 mm and 50 mm, either before or during or after the angle of incidence 82 of the laser beam 24 has been reduced. Of course, like before, the power level of the laser beam 24 may be kept constant during the reduction of the angle of incidence 82 of the laser beam 24 and the optional movement of the focal point 62, or it may be increased or decreased (so long as the power level decrease does not fully offset the irradiance gain attained through the reduction of the angle of incidence 82 and the optional movement of the focal point 62).

Once the molten steel weld pool 90 has been fully grown and penetrates the workpiece stack-up 10 as desired, the transmission of the laser beam 24 is ceased at the weld site 16 in generally the same manner as set forth above with regards to FIG. 7. To reiterate, the transmission of the laser beam 24 may be ceased without first changing the projected sectional area 86 of the laser beam 24 at the plane 88 of the top surface 20, or, alternatively, the projected sectional area 86 of the laser beam 24 at the plane 88 of the top surface 20 of the workpiece stack-up 10 may be increased in order to decrease the irradiance of the laser beam 24. Here, in this embodiment, the increase in the projected sectional area 86 of the laser beam 24 may be accomplished by increasing the angle of incidence 82 of the laser beam 24 which, in turn, increases the eccentricity of the projected sectional area 86 of the laser beam 24 at the plane 88 of the top surface 20. If such a technique is practiced, the irradiance of the laser beam 24, like before, is preferably decreased to somewhere between its elevated irradiance level and its initial irradiance level before transmission of the laser beam 24 is ceased.

Figure 12:
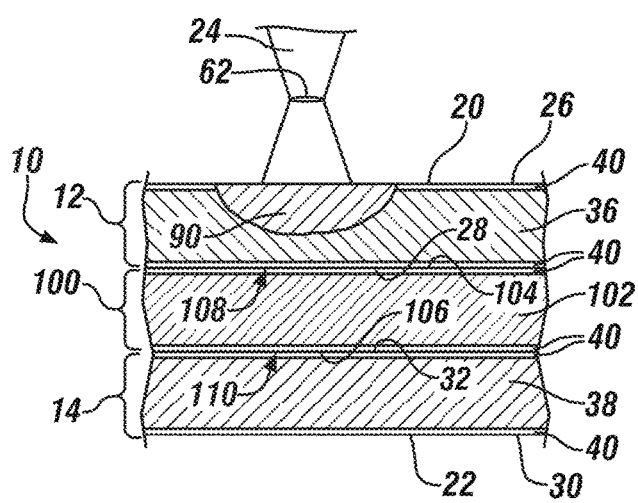
FIG. 12 is a cross-sectional view of the workpiece stack-up during laser spot welding in which the laser beam has an initial irradiance level at the top surface of the workpiece stack-up according to one embodiment, wherein the view in this Figure is taken from the same perspective as shown in FIG. 3, although here the workpiece stack-up includes three steel workpieces that establish two faying interfaces, as opposed to two steel workpieces that establish a single faying interface.
Figure 13:
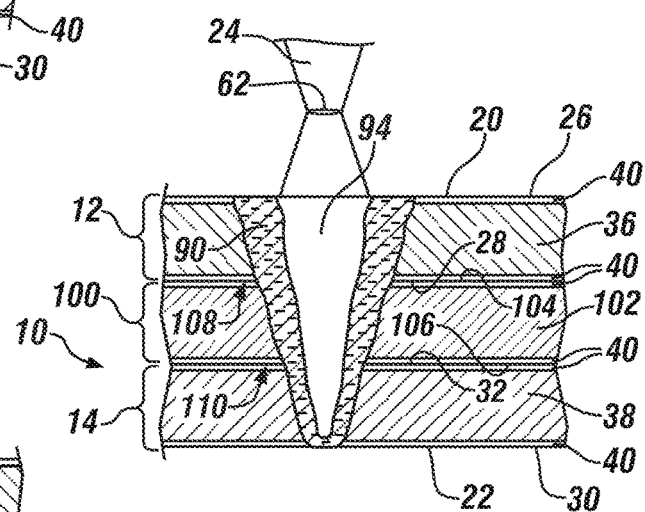
FIG. 13 is a cross-sectional side view of the workpiece stack-up shown in FIG. 12 during laser spot welding in which the irradiance of the laser beam at the top surface of the stack-up has been increased from its initial level (FIG. 12) to an elevated level.
Figure 14:
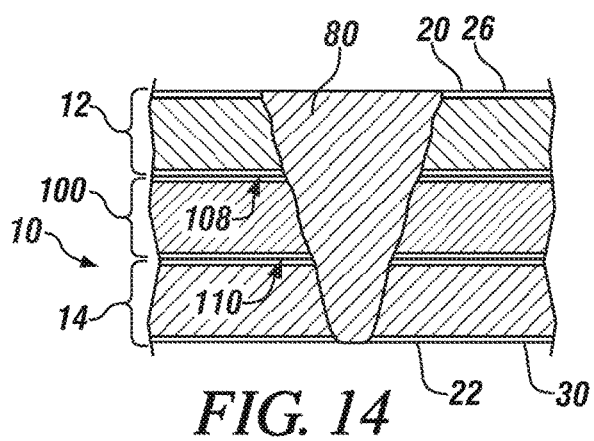
FIG. 14 is a cross-sectional side view of the workpiece stack-up shown in FIG. 12 after transmission of the laser beam has ceased and a laser spot weld joint has been formed between the steel workpieces.

FIGS. 1-11 illustrate the above-described embodiments in the context of the workpiece stack-up 10 being a "2T" stack-up that includes only the first and second steel workpieces 12, 14 with a single faying interface 34. The same embodiments of the disclosed laser spot welding method, however, may also be carried out when the workpiece stack-up 10 is a "3T" stack-up that includes an additional third steel workpiece 100 that overlaps and is situated between the first and second steel workpieces 12, 14, as depicted in FIGS. 12-14. In fact, regardless of whether the workpiece stack-up 10 is 2T or 3T, the laser spot welding method does not have to be modified all that much to form the laser spot weld joint 80. And, in each instance, the laser spot weld joint 80 can achieve good quality strength properties despite the fact that at least one, and sometimes all, of the steel workpieces includes a surface coating 40 comprised of a zinc-based material or an aluminum-based material.

Referring now to FIGS. 12-13, the additional third steel workpiece 100, if present, includes a third base steel substrate 102 that may be bare or coated with the same surface coating 40 described above. When the workpiece stack-up 10 includes the first, second, and third overlapping steel workpieces 12, 14, 100, the base steel substrate 36, 38, 102 of at least one of the workpieces 12, 14, 100, and preferably all of them, includes the surface coating 40. As for the characteristics (e.g., composition, thickness, etc.) of the third base steel substrate 102, the descriptions above regarding the first and second base steel substrates 36, 38 are equally applicable to that substrate 102 as well. It should be noted, though, that while the same general descriptions apply to the several steel workpieces 12, 14, 100, there is no requirement that the steel workpieces 12, 14, 100 be identical to one another. In many instances, the first, second, and third steel workpieces 12, 14, 100 are different in some aspect from each other whether it be composition, thickness, and/or form.

As a result of stacking the first, second, and third steel workpieces 12, 14, 100 in overlapping fashion to provide the workpiece stack-up 10, the third steel workpiece 92 has two faying surfaces 104, 106. One of the faying surfaces 104 overlaps and confronts the first faying surface 28 of the first steel workpiece 12 and the other faying surface 106 overlaps and confronts the second faying surface 32 of the second steel workpiece 14, thus establishing two faying interfaces 108, 110 within the workpiece stack-up 10 that extend through the weld site 16. These faying interfaces 108, 110 are the same type and encompass the same attributes as the faying interface 34 already described with respect to FIGS. 3-4. Consequently, in this embodiment as described herein, the outer surfaces 26, 30 of the flanking first and second steel workpieces 12, 14 still face away from each other in opposite directions and constitute the top and bottom surfaces 20, 22 of the workpiece stack-up 10.

Forming the molten steel weld pool 90, and optionally producing the keyhole 94 within the weld pool 90, is carried out when the workpiece stack-up 10 includes the first, second, and third steel workpieces 12, 14, 100 by directing the laser beam 24 at the workpiece stack-up 10 such that it impinges the top surface 20 at the weld site 16, as shown in FIG. 12. The irradiance of the laser beam 24 at the top surface 20 of the workpiece stack-up 10 is then increased from an initial level to an elevated level by reducing the projected sectional area 86 of the laser beam 24 at the plane 88 of the top surface 20 of the workpiece stack-up 10 as previously described, as shown in FIG. 13. This may involve moving the focal point 62 of the laser beam 24 relative to the top surface 20 to shorten the distance 92 between the focal point 62 and the top surface 20 and/or reducing the angle of incidence 82 of the laser beam 24 to reduce the eccentricity of the elliptical nature of the projected sectional area 86 of the laser beam 24. After the increase in the irradiance of the laser beam 24 has grown the molten steel weld pool 90 to the desired size and the desired depth of penetration, the transmission of the laser beam is ceased at the weld site 16, and the laser spot weld joint 80 is obtained from the molten steel weld pool 90, as shown in FIG. 14.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser spot welding overlapping steel workpieces, the method comprising:
providing a workpiece stack-up that includes overlapping steel workpieces, the workpiece stack-up comprising at least a first steel workpiece and a second steel workpiece, the first steel workpiece providing a top surface of the workpiece stack-up and the second steel workpiece providing a bottom surface of the workpiece stack-up, wherein a faying interface is established between each pair of adjacent overlapping steel workpieces within the workpiece stack-up, and wherein at least one of the steel workpieces in the workpiece stack-up includes a surface coating comprised of a zinc-based material or an aluminum-based material;
directing a laser beam at the top surface of the workpiece stack-up, the laser beam impinging the top surface over a projected sectional area at a plane of the top surface and creating a molten steel weld pool that penetrates into the workpiece stack-up from the top surface towards the bottom surface;
increasing an irradiance of the laser beam at the top surface of the workpiece stack-up from an initial level to an elevated level by reducing the projected sectional area of the laser beam at the plane of the top surface of the workpiece stack-up, the increase in the irradiance from the initial level to the elevated level causing the molten steel weld pool to grow and to further penetrate into the workpiece stack-up towards the bottom surface; and
ceasing transmission of the laser beam to allow the molten steel weld pool to solidify into a laser spot weld joint comprised of resolidified composite steel material derived from each of the steel workpieces in the workpiece stack-up, the resolidified composite steel material of the laser spot weld joint intersecting each of the faying interfaces within the workpiece stack-up to fusion weld the steel workpieces together.

2. The method set forth in claim 1, wherein the first steel workpiece has an exterior outer surface and a first faying surface, and the second steel workpiece has an exterior outer surface and a second faying surface, the exterior outer surface of the first steel workpiece providing the top surface of the workpiece stack-up and the exterior outer surface of the second steel workpiece providing the bottom surface of the workpiece stack-up, and wherein the first and second faying surfaces of the first and second steel workpieces overlap and confront each other to establish a faying interface.

3. The method set forth in claim 1, wherein the first steel workpiece has an exterior outer surface and a first faying surface, and the second steel workpiece has an exterior outer surface and a second faying surface, the exterior outer surface of the first steel workpiece providing the top surface of the workpiece stack-up and the exterior outer surface of the second steel workpiece providing the bottom surface of the workpiece stack-up, and wherein the workpiece stack-up comprises an additional third steel workpiece situated between the first and second steel workpieces, the third steel workpiece having opposed faying surfaces, one of which overlaps and confronts the first faying surface of the first steel workpiece to establish a first faying interface and the other of which overlaps and confronts the second faying surface of the second steel workpiece to establish a second faying interface.

4. The method set forth in claim 1, wherein each of the steel workpieces in the workpiece stack-up includes a surface coating comprised of a zinc-based material or an aluminum-based material.

5. The method set forth in claim 1, wherein a keyhole is produced within the molten steel weld pool when increasing the irradiance of the laser beam from the initial level to the elevated level.

6. The method set forth in claim 1, wherein the initial irradiance level of the laser beam ranges from 500 W/cm$^2$ to $1.0 \times 10^6$ W/cm$^2$, and wherein the elevated irradiance level of the laser beam ranges from 1000 W/cm$^2$ to $1.0 \times 10^9$ W/cm$^2$.

7. The method set forth in claim 1, wherein the laser beam propagates towards the top surface along a longitudinal beam axis and further includes a focal point positioned a distance relative to the top surface along the longitudinal beam axis, and wherein increasing the irradiance of the laser beam at the top surface of the workpiece stack-up comprises moving the focal point of the laser beam along the longitudinal beam axis so as to shorten the distance between the focal point and the top surface of the workpiece stack-up.

8. The method set forth in claim 7, wherein the distance between the focal point of the laser beam and the top surface of the workpieces stack-up along the longitudinal beam axis is reduced from between −300 mm and 300 mm to between −280 mm and 280 mm.

9. The method set forth in claim 1, wherein the laser beam propagates towards the top surface along a longitudinal beam axis at an angle of incidence to the top surface of the workpiece stack-up to thereby render the projected sectional area of the laser beam at the plane of the top surface elliptical in shape, and wherein increasing the irradiance of the laser beam at the top surface of the workpiece stack-up comprises reducing the angle of incidence of the laser beam so as to reduce an eccentricity of the projected sectional area of the laser beam at the plane of the top surface.

10. The method set forth in claim 9, wherein the angle of incidence of the laser beam is reduced from between 1° and 45° to between 0° and 30°.

11. The method set forth in claim 1, wherein increasing the irradiance of the laser beam from the initial level to the elevated level grows the molten steel weld pool such that the molten steel weld pool penetrates all the way through second steel workpiece and breaches the bottom surface of the workpiece stack-up.

12. The method set forth in claim 1, wherein directing the laser beam at the top surface of the workpiece stack-up comprises emitting the laser beam from a laser optic welding head positioned above the top surface of the workpiece stack-up, the laser optic welding head including a focusing lens from which the laser beam propagates forward towards the top surface of the workpiece stack-up along a longitudinal beam axis, the focusing lens converging the laser beam to a focal point on the longitudinal beam axis that has a focal length between 50 mm and 350 mm, and wherein a lens axis of the focusing lens is coaxial with the longitudinal beam axis of the laser beam.

13. The method set forth in claim 1, wherein the laser beam is a solid-state laser beam.

14. The method set forth in claim 1, wherein none of the steel workpieces in the workpiece stack-up are scored or mechanically dimpled at a faying interface.

15. A method of laser welding overlapping steel workpieces, the method comprising:
   providing a workpiece stack-up that includes overlapping steel workpieces, the workpiece stack-up comprising at least a first steel workpiece and a second steel workpiece, the first steel workpiece providing a top surface of the workpiece stack-up and the second steel workpiece providing a bottom surface of the workpiece stack-up, wherein a faying interface is established between each pair of adjacent overlapping steel workpieces within the workpiece stack-up, and wherein at least one of the steel workpieces in the workpiece stack-up includes a surface coating comprised of a zinc-based material or an aluminum-based material;
   positioning a laser optic welding head to direct a solid-state laser beam at the top surface of the workpiece stack-up such that the laser beam impinges the top surface at a weld site and creates a molten steel weld pool that penetrates into the workpiece stack-up, the laser optic welding head including a focusing lens from which the solid-state laser beam propagates forward towards the top surface of the workpiece stack-up along a longitudinal beam axis, the focusing lens converging the laser beam to a focal point on the longitudinal beam axis that has a focal length between 50 mm and 350 mm, and wherein a lens axis of the focusing lens is coaxial with the longitudinal beam axis of the laser beam;
   increasing an irradiance of the solid-state laser beam at the top surface of the workpiece stack-up from an initial level to an elevated level by reducing a projected sectional area of the solid-state laser beam at a plane of the top surface of the workpiece stack-up, the increase in the irradiance from the initial level to the elevated level causing the molten steel weld pool to grow and to further penetrate into the workpiece stack-up towards the bottom surface; and
   ceasing transmission of the solid-state laser beam to allow the molten steel weld pool to solidify into a laser spot weld joint comprised of resolidified composite steel material derived from each of the steel workpieces in the workpiece stack-up, the resolidified composite steel material of the laser spot weld joint intersecting each of the faying interfaces within the workpiece stack-up to fusion weld the steel workpieces together.

16. The method set forth in claim 15, wherein the workpiece stack-up includes only the first and second steel workpieces, or wherein the workpiece stack-up further includes an additional third steel workpiece disposed between the first and second steel workpieces.

17. The method set forth in claim 15, wherein the initial irradiance level of the laser beam ranges from 500 W/cm$^2$ to $1.0\times10^6$ W/cm$^2$, and wherein the elevated irradiance level of the laser beam ranges from 1000 W/cm$^2$ to $1.0\times10^9$ W/cm$^2$.

18. The method set forth in claim 15, wherein the focal point of the solid-state laser beam is positioned a distance relative to the top surface of the workpiece stack-up, and wherein increasing the irradiance of the solid-state laser beam comprises moving the laser optic welding head to move the focal point of the solid-state laser beam along the longitudinal beam axis so as to shorten the distance between the focal point and the top surface of the workpiece stack-up.

19. The method set forth in claim 15, wherein the solid-state laser beam has an angle of incidence that renders the projected sectional area of the solid-state laser beam at the plane of the top surface elliptical in shape, and wherein increasing the irradiance of the solid-state laser beam comprises moving the laser optic welding head to reduce the angle of incidence of the solid-state laser beam so as to reduce an eccentricity of the projected sectional area of the laser beam at the plane of the top surface.

20. The method set forth in claim 15, wherein the elevated level of the laser beam irradiance is above $1.0\times10^6$ W/cm$^2$ and a keyhole is produced within the molten steel weld pool when increasing the irradiance of the laser beam from the initial level to the elevated level.

\* \* \* \* \*